(12) United States Patent
Niitani et al.

(10) Patent No.: US 7,649,079 B2
(45) Date of Patent: Jan. 19, 2010

(54) METHOD FOR REMOVING METAL AND METHOD FOR PRODUCING POLYMER

(75) Inventors: Takeshi Niitani, Ichihara (JP); Mitsuo Sawamoto, Kyoto (JP); Tsuyoshi Andoh, Kyoto (JP)

(73) Assignee: Nippon Soda Co., Ltd., Tokyo (JP)

( * ) Notice: Subject to any disclaimer, the term of this patent is extended or adjusted under 35 U.S.C. 154(b) by 225 days.

(21) Appl. No.: 11/722,838

(22) PCT Filed: Dec. 28, 2005

(86) PCT No.: PCT/JP2005/024037

§ 371 (c)(1),
(2), (4) Date: Jun. 26, 2007

(87) PCT Pub. No.: WO2006/070858

PCT Pub. Date: Jul. 6, 2006

(65) Prior Publication Data

US 2008/0119635 A1 May 22, 2008

(30) Foreign Application Priority Data

Dec. 28, 2004 (JP) .............................. 2004-380476

(51) Int. Cl.
*C08F 6/00* (2006.01)
*B01J 37/00* (2006.01)

(52) U.S. Cl. ...................... 528/492; 502/150; 502/152; 556/20; 556/21

(58) Field of Classification Search ................ 502/150, 502/152; 528/492; 556/20, 21
See application file for complete search history.

(56) References Cited

U.S. PATENT DOCUMENTS

| | | | |
|---|---|---|---|
| 4,944,926 A | 7/1990 | Osman et al. | |
| 5,120,443 A * | 6/1992 | Bruening et al. | ............ 210/638 |
| 5,302,183 A | 4/1994 | De Boer et al. | |
| 5,403,566 A | 4/1995 | Panster et al. | |
| 5,559,262 A * | 9/1996 | Beatty et al. | ................... 556/20 |
| 5,637,741 A | 6/1997 | Matsumoto et al. | |
| 6,348,554 B1 | 2/2002 | Roos et al. | |

FOREIGN PATENT DOCUMENTS

| | | |
|---|---|---|
| CN | 1313344 | 9/2001 |
| CN | 1483744 | 3/2004 |
| EP | 1780224 A | 5/2007 |
| JP | 4-290555 A | 10/1992 |
| JP | 11-35676 A | 2/1999 |
| JP | 2000-239210 A | 9/2000 |
| JP | 2001-048824 A | 2/2001 |
| JP | 2002-249457 A | 9/2002 |
| JP | 2003-96130 A | 4/2003 |
| JP | 2003-147015 A | 5/2003 |
| JP | 2004-2768 A | 1/2004 |
| JP | 2004-500448 A | 1/2004 |
| JP | 2004-352974 A | 12/2004 |
| JP | 2005-105265 A | 4/2005 |

OTHER PUBLICATIONS

"Design for Radical Polymerization System using Transition Metal Complex" by Uegaki et al., Chemistry Today, Jun. 2001, pp. 34-42 and partial English translation.

* cited by examiner

*Primary Examiner*—Terressa M Boykin
(74) *Attorney, Agent, or Firm*—Darby & Darby PC

(57) ABSTRACT

A method for easily and efficiently removing ruthenium complexes, which are generally difficult to remove, from a polymer, as well as a method for purifying a polymer that uses such a removal method are provided. A method for removing a metal, wherein a compound is added that is capable of coordination via a substitution of a ligand of a ruthenium complex, thereby precipitating another ruthenium complex, as well as a method for purifying a polymer that uses such a method.

10 Claims, No Drawings

METHOD FOR REMOVING METAL AND METHOD FOR PRODUCING POLYMER

CROSS REFERENCE TO RELATED APPLICATIONS

This is a U.S. national phase application under 35 U.S.C. §371 of International Patent Application No. PCT/JP2005/024037, filed Dec. 28, 2005, which claims the benefit of Japanese Patent Application No. 2004-380476, filed Dec. 28, 2004, both of which are incorporated by reference herein. The International Application was published in Japanese on Jul. 6, 2006 as International Publication No. WO 2006/070858 under PCT Article 21(2).

TECHNICAL FIELD

The present invention relates to a method for removing metal and a method for producing a polymer, and relates more specifically to a method for removing ruthenium complexes and a method for producing a polymer from which ruthenium complexes have been removed.

BACKGROUND ART

In recent years, much research has been conducted into polymerization methods, with the aim of obtaining polymers that function as high value-added materials or highly functional materials that exhibit superior properties or function, and metal catalysts are frequently used in these polymerization reactions. In polymerization methods that use such metal catalysts, the metal catalyst remains within the produced polymer, and various methods have been proposed for recovering this metal catalyst (see patent references 1 to 5).

One example of the polymerization methods described above is a living radical polymerization method (for example, see non-patent reference 1), and in this type of living radical polymerization method, a copper complex or ruthenium complex is mainly used as the catalyst. An example of a method that has been proposed for removing the copper complex from a polymer produced using such a copper complex is a method that involves adding an organic acid (see patent reference 6).

[Patent Reference 1]
Japanese Unexamined Patent Application, First Publication No. Hei 8-141407
[Patent Reference 2]
Japanese Unexamined Patent Application, First Publication No. Hei 6-41652
[Patent Reference 3]
Japanese Unexamined Patent Application, First Publication No. 2000-239210
[Patent Reference 4]
Japanese Unexamined Patent Application, First Publication No. 2001-48824
[Patent Reference 5]
Japanese Unexamined Patent Application, First Publication No. 2002-249457
[Patent Reference 6]
Japanese Unexamined Patent Application, First Publication No. Hei 2003-147015
[Non-Patent Reference 1]
Chemistry Today, June 2001, pages 34 to 42.

DISCLOSURE OF INVENTION

Problems to be Solved by the Invention

In polymerization methods that use a metal catalyst, a problem arises in that the metal catalyst remains within the produced polymer. As described above, a multitude of methods have been proposed for removing this type of residual metal catalyst, and in the method for removing a copper complex disclosed in the patent reference 6, because the copper complex exists in the form of ions within the system, a technique is used in which these ions are trapped with an organic acid. On the other hand, because copper complexes are soluble in water, a large proportion of the copper complexes can be removed simply by washing with water.

In contrast, ruthenium complexes are either insoluble or sparingly soluble in water, meaning removing such complexes by water washing is extremely difficult, and accordingly, a method for efficiently removing these ruthenium complexes, which are generally extremely difficult to remove, has been keenly sought.

An object of the present invention is to provide a method for easily and efficiently removing ruthenium complexes, which are generally difficult to remove, from a polymer, as well as a method for producing a polymer that employs such a removal method.

Means for Solving the Problems

The inventors of the present invention undertook the development of a method for removing a ruthenium complex from a polymer produced using a ruthenium complex as the polymerization catalyst, wherein the method was not a non-industrial method such as a column purification or adsorption method, but was rather an industrially applicable method, and as a result of intensive investigation, they discovered that by adding a compound to the reaction system that is capable of coordination via a substitution of a ligand of the ruthenium complex, a ruthenium complex could be precipitated out via the type of reaction shown below, and that as a result, the ruthenium complex could be removed easily and efficiently, and they were therefore able to complete the present invention.

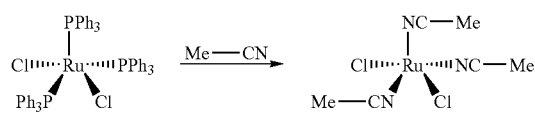

[Formula 1]

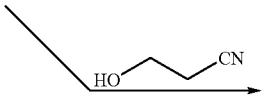 → 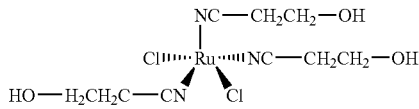

In other words, the present invention relates to: (1) a method for removing metallic ruthenium incorporated within a ruthenium complex from a polymerization system, that includes the step of adding a compound that is capable of coordination via a substitution of a ligand of the ruthenium complex, thereby precipitating another ruthenium complex in which a ligand has been substituted; (2) a method for removing metallic ruthenium according to (1) above, wherein the polymerization system is a living radical polymerization system; (3) a method for removing metallic ruthenium according to (2) above, wherein a tertiary amine is used as a reaction accelerant for the living radical polymerization; (4) a method for removing metallic ruthenium according to any one of (1) through (3) above, wherein the compound that is capable of coordination via a substitution of a ligand of the ruthenium complex is a nitrile compound; (5) a method for removing metallic ruthenium according to any one of (1) through (4) above, wherein the ruthenium complex is dichlorotris(triphenylphosphine) ruthenium; and (6) a method for producing a polymer, wherein a method for removing metallic ruthenium according to any one of (1) through (5) above is used for removing metal and purifying the polymer.

EFFECTS OF THE INVENTION

According to the present invention, ruthenium complexes can be removed easily and efficiently from a polymer or a polymerization solution obtained following recovery of a polymer, and furthermore, a purified polymer from which ruthenium complexes have been satisfactorily removed can be obtained.

BEST MODE FOR CARRYING OUT THE INVENTION

There are no particular restrictions on the method for removing a metal of the present invention, provided the method represents a method for removing a ruthenium complex from a polymerization system, and includes the step of adding a compound that is capable of coordination via a substitution of a ligand of the ruthenium complex, thereby precipitating another ruthenium complex in which a ligand has been substituted, and as such, the method is a removal method for a polymerized polymer or a polymer solution obtained following recovery of a polymer, and more specifically, is a removal method for a polymer or a polymerization solution obtained by conducting a polymerization using any of a variety of methods that use a ruthenium complex as a catalyst, such as a living radical polymerization method. Examples of the form of the ruthenium complex precipitate include a dispersed state and a settled state, and subsequent removal of the ruthenium complex can be achieved by normal filtration, filtration under reduced pressure, pressurized filtration, centrifugal filtration or decantation. According to a method for removing a metal according to the present invention, the quantity of residual ruthenium complex can be reduced to a level no higher than 10 ppm.

There are no particular restrictions on the ruthenium complex in the present invention, provided it is a complex having a ruthenium metal core surrounded by ligands, and suitable examples of the ligands that form the complex include triarylphosphines of 18 to 54 carbon atoms such as triphenylphosphine and trinaphthylphosphine; trialkylphosphines of 3 to 18 carbon atoms such as triethylphosphine and tributylphosphine; triaryl phosphites such as triphenyl phosphite; diphenylphosphinoethane; halogen atoms such as an iodine, bromine or chlorine atom; carbon monoxide; a hydrogen atom; hydrocarbon ligands such as cyclopentadiene, cyclohexadiene, cyclooctadiene, cyclooctatetraene, indene, norbornadiene, benzene, cymene, 4-isopropyltoluene, cyclopentadienyltoluene, indenyltoluene, 2-methylpentene, 2-butene and allene; oxygen-containing ligands such as furan, phenol, salicylidene, and carboxylic acids; other chalcogenides; and nitrogen-containing ligands.

The hydrocarbon ligands descried above may also contain a substituent group. Examples of suitable substituent groups include alkyl groups including C1 to C4 alkyl groups such as a methyl group or ethyl group; alkenyl groups including C2 to C5 alkenyl groups such as a vinyl group or allyl group; alkynyl groups; alkoxy groups including C1 to C4 alkoxy groups such as a methoxy group; alkoxycarbonyl groups including C1 to C4 alkoxy-carbonyl groups such as a methoxycarbonyl group; acyl groups including C2 to C5 acyl groups such as an acetyl group; acyloxy groups including C2 to C5 acyloxy groups such as an acetyloxy group; as well as a carboxyl group, hydroxyl group, amino group, amide group, imino group, nitro group, cyano group, thioester group, thioketone group, or thioether group; and a halogen atom such as a chlorine or bromine atom. Specific examples of hydrocarbon ligands that contain a substituent include ligands such as a pentamethylcylcopentadiene.

Furthermore, besides the ligands exemplified above, the complex may also include a hydroxyl group; an alkoxy group such as a methoxy, ethoxy, propoxy or butoxy group; an acyl group such as an acetyl or propionyl group; an alkoxycarbonyl group such as a methoxycarbonyl or ethoxycarbonyl group; a β-diketone group such as an acetylacetonate group; a β-ketoester group such as an acetylacetate group; a pseudohalogen group such as a CN, thiocyanate (SCN), selenocyanate (SeCN), tellurocyanate (TeCN), $SCSN_3$, OCN, ONC or azide ($N_3$) group; an oxygen atom; $H_2O$; or a nitrogen-containing compound such as $NH_3$, NO, $NO_2$, $NO_3$, ethylenediamine, diethylenetriamine, tributylamine, 1,3-diisopropyl-4,5-dimethylimidazol-2-ylidene, pyridine, phenanthroline, diphenanthroline, a substituted phenanthroline, 2,2':6',2''-terpyridine, pyridineimine, a cross-linked aliphatic diamine, 4-4'-di(5-nonyl)-2,2'-bipyridine, a thiocyanate-, O-, S-, Se- or Te-coordinated bipyridine, an alkyliminopyridine, alkylbipyridinylamine, alkyl-substituted tripyridine, di(alkylamino)alkylpyridine, ethylenediaminedipyridine or tri(pyridinylmethyl)amine.

Specific examples of the ruthenium complex of the present invention include dichlorotris(triphenylphosphine) ruthenium, dichlorotris(tributylphosphine) ruthenium, dichloro (trialkylphosphine)-p-cymene ruthenium, dichlorobis(tricymenephosphine)styryl ruthenium, dichloro(cyclooctadiene) ruthenium, dichlorobenzene ruthenium, dichloro-p-cymene ruthenium, dichloro(norbornadiene) ruthenium, cis-dichlorobis(2,2'-bipyridine) ruthenium, dichlorotris(1,10-phenanthroline) ruthenium, carbonylchlorohydridotris(triphenylphosphine) ruthenium, chlorocyclopentadienylbis(triphenylphosphine) ruthenium, chloropentamethylcyclopentadienylbis(triphenylphosphine) ruthenium, chloroindenylbis(triphenylphosphine) ruthenium, and dihydrotetra(triphenylphosphine) ruthenium; as well as dicarbonylcyclopentadienyl ruthenium (II) iodide, dicarbonylcyclopentadienyl ruthenium (II) bromide, dicarbonylcyclopentadienyl ruthenium (II) chloride, dicarbonylindenyl ruthenium (II) iodide, dicarbonylindenyl ruthenium (II) bromide, dicarbonylindenyl ruthenium (II) chloride, dicarbonylfluorenyl ruthenium (II) iodide, dicarbonylfluorenyl ruthenium (II) bromide, dicarbonylfluorenyl ruthenium (II) chloride, and dichloro-di-2,6-bis[(dimethylamino)-methyl]($\mu$-$N_2$)pyridine ruthenium (II).

Of these, from the viewpoint of achieving superior polymerization activity, dichlorotris(triphenylphosphine) ruthenium, chloroindenylbis(triphenylphosphine) ruthenium, dihydrotetrakis(triphenylphosphine) ruthenium, chlorocyclopentadienylbis(triphenylphosphine) ruthenium, chloropentamethylcyclopentadienylbis(triphenylphosphine) ruthenium and dicarbonylcyclopentadienyl ruthenium (II) iodide are preferred, and if due consideration is also given to the ease with which the complex can be removed from the polymer, then dichlorotris(triphenylphosphine) ruthenium is particularly desirable.

Examples of the compound that is capable of coordination via a substitution of a ligand of the ruthenium complex include nitrile compounds, (alkyl)phosphorus-based compounds such as $PPh_3$, and amines having an active hydrogen atom, although of these, nitrile compounds are preferred. Examples of suitable nitrile compounds include alkyl nitrites which may include a substituent and aryl nitrites which may also include a substituent, and the alkyl nitrites are preferably C1 to C12 alkyl nitrites, with specific examples including acetonitrile, propionitrile, butyronitrile, malononitrile, oxalonitrile, succinonitrile, acrylonitrile, fumaronitrile, and maleonitrile. The aryl nitrites are preferably C6 to C14 aryl nitrites, and specific examples include benzonitrile, 2-naphthylnitrile, 1-naphthylnitrile, and terephthalonitrile. There are no particular restrictions on the substituent, provided the substituent does not impair the coordination via a substitution of a ligand of the ruthenium complex, and suitable substituents include a hydroxyl group or an alkoxy group.

There are no particular restrictions on the quantity added of the compound that is capable of coordination via a substitution of a ligand of the ruthenium complex, provided the compound is added in excess, and although the quantity required varies depending on factors such as the ease with which the ligands of the ruthenium complex undergoing removal are able to be substituted, and the number of ligands requiring substitution, a typically quantity is within a range from 1 to 100 molar equivalents, and preferably from 2 to 50 molar equivalents, relative to the ruthenium complex. For example, in the case of dichlorotris(triphenylphosphine) ruthenium, the quantity added of the nitrile compound (acetonitrile) is preferably within a range from 2 to 50 molar equivalents, and even more preferably from 10 to 20 molar equivalents.

There are no particular restrictions on the method for producing a polymer according to the present invention, provided the method uses the aforementioned method for removing a metal of the present invention to remove the metal and purify the polymer, and by employing the method for producing a polymer according to the present invention, a polymer with a ruthenium complex content of no more than 10 ppm can be obtained.

In the present invention, in terms of the timing with which the compound that is capable of coordination via a substitution of a ligand of the ruthenium complex is added to the reaction system, the compound may be added together with the raw material monomers at the point of polymerization reaction initiation, may be added once the polymerization reaction has progressed a certain amount, may be added at a point at least midway through the reaction, or may be added following completion of the polymerization reaction, although from the viewpoints of achieving superior control of the molecular weight of the polymer and obtaining a polymer with a narrow molecular weight distribution, adding the compound at a point at least midway through the reaction is preferred, and adding the compound following completion of the polymerization reaction is even more desirable. Adding the compound at a point at least midway through the reaction means adding the compound once the polymerization reaction has progressed at least 50%, and adding the compound once the polymerization reaction has progressed at least 70% is preferred, and adding the compound once the polymerization reaction has progressed at least 90% is even more preferred. Furthermore, if the compound is added following completion of the polymerization reaction, addition may be conducted without cooling (at approximately the polymerization temperature), or may be conducted following cooling.

An example of the living radical polymerization method described in the present invention is a living radical polymerization method in which an organohalogen compound having at least one halogen atom within each molecule is used as an initiator, and the polymerization reaction is conducted using a ruthenium complex as a catalyst. The quantity used of the catalyst can be selected appropriately in accordance with the molecular weight required for the product polymer, and is typically within a range from 1 to 50 mol %, preferably from 5 to 45 mol %, and even more preferably from 20 to 40 mol %, relative to the raw material monomers used.

In a living radical polymerization method according to the present invention, a Lewis acid and/or an amine may be used as a reaction accelerant (activating agent) that accelerates the radical polymerization by acting upon the ruthenium complex. By using a Lewis acid, the removal of the ruthenium complex can be conducted more effectively, whereas by using an amine, the total metal content of the product polymer can be reduced since the amine itself contains no metal.

There are no particular restrictions on the types of Lewis acids that can be used, and suitable examples include the compounds represented by the formulas (1) and (2) shown below.

[Formula 2]

(1)

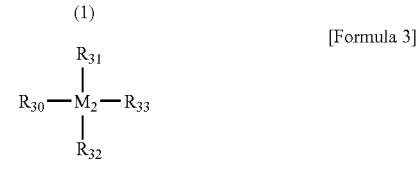

[Formula 3]

(2)

In the above formulas, $M_1$ represents an element group 3 of the periodic table such as Sc or Y, or an element group 13 of the periodic table such as B, Al, Ga or In. Of these, $M_1$ is preferably Sc, B or Al, and is even more preferably Sc or Al. $M_2$ represents an element group 4 of the periodic table such as Ti, Zr or Hf, or an element group 14 of the periodic table such as Si, Sn or Pb. Of these, $M_2$ is preferably Ti, Zr or Sn.

$R_{30}$ to $R_{33}$ each represent, independently, a halogen atom, alkyl group, cycloalkyl group, aryl group, aralkyl group, alkoxy group, cycloalkyloxy group, aryloxy group, or aralkyloxy group. Examples of suitable alkyl groups, cycloalkyl groups, aryl groups and aralkyl groups for $R_{30}$ to $R_{33}$ include the same groups as those exemplified above as specific examples of $R_{20}$ to $R_{22}$.

Examples of suitable halogen atoms for $R_{30}$ to $R_{33}$ include a fluorine, chlorine or bromine atom. Examples of suitable alkoxy groups include an ethoxy group, isopropoxy group, n-butoxy group, s-butoxy group or t-butoxy group. Examples of suitable cycloalkyloxy groups include C4 to C12 cycloalkyloxy groups, and preferably C4 to C8 cycloalkyloxy groups, including a cyclopentyloxy group, cyclohexyloxy group or cyclooctyloxy group. Examples of suitable aryloxy groups include C6 to C13 aryloxy groups such as a phenoxy group. Examples of suitable aralkyloxy groups include C7 to C14 aralkyloxy groups such as a benzyloxy group or phenethyloxy group.

The alkyl groups, cycloalkyl groups, aryl groups, aralkyl groups, alkoxy groups, cycloalkyloxy groups, aryloxy groups or aralkyloxy groups of $R_{30}$ to $R_{33}$ may also include a substituent. For example, the aryloxy group may contain one or more C1 to C5 alkyl groups on the aromatic ring. Specific examples include a 2-methylphenoxy group, 3-methylphenoxy group, 4-methylphenoxy group, 2-ethylphenoxy group, 3-ethylphenoxy group, 4-ethylphenoxy group, 2,6-dimethylphenoxy group, 2,6-diethylphenoxy group, 2,6-diisopropylphenoxy group, 2,6-di-n-butylphenoxy group, or 2,6-di-t-butylphenoxy group. Of the various possibilities, the groups $R_{30}$ to $R_{33}$ are preferably halogen atoms or alkoxy groups.

Specific examples of compounds represented by the above formula (1) include aluminum-based Lewis acids, including aluminum C1 to C4 alkoxides or aryloxides such as aluminum triethoxide, aluminum triisopropoxide, aluminum tri-s-butoxide, aluminum tri-t-butoxide and aluminum triphenoxide; aluminum alkoxides such as methylaluminum bis(2,6-di-t-butylphenoxide), ethylaluminum bis(2,6-di-t-butylphenoxide), and methylaluminum bis(2,6-di-t-butyl-4-methylphenoxide); and aluminum halides including aluminum trihalides such as aluminum trichloride, aluminum tribromide, and aluminum triiodide; and scandium-based Lewis acids, including scandium alkoxides such as scandium triisopropoxide, and scandium halides such as scandium trichloride, scandium tribromide and scandium triiodide.

Specific examples of compounds represented by the above formula (2) include titanium-based Lewis acids, including titanium alkoxides such as titanium tetramethoxide, titanium tetraethoxide, titanium tetra-n-propoxide, titanium tetraisopropoxide, titanium tetra-n-butoxide, titanium tetra-t-butoxide, titanium tetraphenoxide, chlorotitanium triisopropoxide, dichlorotitanium diisopropoxide, and trichlorotitanium isopropoxide; and titanium halides such as titanium tetrachloride, titanium tetrabromide, and titanium tetraiodide;

zirconium-based Lewis acids, including zirconium alkoxides such as zirconium tetraethoxide, zirconium tetra-n-propoxide, zirconium tetraisopropoxide, zirconium tetra-n-butoxide and zirconium tetra-t-butoxide, and zirconium halides such as zirconium tetrachloride, zirconium tetrabromide and zirconium tetraiodide; and tin-based Lewis acids including tin alkoxides such as tin tetraisopropoxide, and tin halides such as tin tetrachloride, tin tetrabromide and tin tetraiodide.

Of these, Al, Sc, Ti, Zr and Sn compounds are preferred as the Lewis acid, and metal alkoxides of these metals are particularly desirable. Specific examples of preferred compounds include aluminum alkoxides such as aluminum triethoxide, aluminum triisopropoxide, aluminum tri-s-butoxide and aluminum tri-t-butoxide; scandium alkoxides such as scandium triisopropoxide; titanium alkoxides such as titanium tetramethoxide, titanium tetraethoxide, titanium tetraisopropoxide, titanium tetra-n-butoxide, titanium tetra-t-butoxide and titanium tetraphenoxide; zirconium alkoxides such as zirconium tetraisopropoxide; and tin alkoxides such as tin tetraisopropoxide. These Lewis acids may be used either alone, or in combinations of two or more different compounds.

There are no particular restrictions on the types of amines that can be used, although secondary amines and tertiary amines are preferred, and tertiary amines are particularly desirable as they yield a higher removal rate for the ruthenium complex.

Specific examples of suitable secondary amines include dimethylamine, diethylamine, di-n-propylamine, diisopropylamine, di-n-butylamine, pyrrolidine, piperidine, 2,2,6,6-tetramethylpiperidine, piperazine and morpholine.

Specific examples of suitable tertiary amines include trimethylamine, triethylamine, tri-n-propylamine, tri-n-butylamine, diisopropylethylamine, N,N,N',N'-tetramethylethylenediamine, 1,5-diazabicyclo[4.3.0]non-5-ene, 1,4-diazabicyclo[2.2.2]octane, and 1,8-diazabicyclo[5.4.0]undec-7-ene.

In the present invention, a compound containing at least two portions selected from amongst a primary amine portion, a secondary amine portion and a tertiary amine portion within each molecule may also be used as the amine. Specific examples of such compounds include diethylenetriamine, triethylenetetramine, tetraethylenepentamine, and 4-(2-aminoethyl)piperidine. These amines may be used either alone, or in combinations of two or more different compounds.

The combined quantity of the Lewis acid and/or the amine is typically within a range from 0.1 to 20 mols, and preferably from 0.2 to 10 mols, per 1 mol of the ruthenium complex.

There are no particular restrictions on the polymerization method, and suitable methods include conventional methods such as bulk polymerization, solution polymerization, suspension polymerization and emulsion polymerization, although solution polymerization is particularly desirable. There are no particular restrictions on the organic solvent used, and suitable solvents include aromatic hydrocarbons such as benzene, toluene and xylene; aliphatic hydrocarbons such as hexane and octane; alicyclic hydrocarbons such as cyclohexane and cyclopentane; ketones such as acetone, methyl ethyl ketone and cyclohexanone; ethers such as tetrahydrofuran and dioxane; esters such as ethyl acetate and butyl acetate; amides such as N,N-dimethylformamide and N,N-dimethylacetamide; sulfoxides such as dimethylsulfoxide; alcohols such as methanol and ethanol; and polyhydric alcohol derivatives such as ethylene glycol monomethyl ether and ethylene glycol monomethyl ether acetate. These solvents may be used either alone, or in combinations of two or more different solvents. Furthermore, in those cases where an intermittent block polymerization is conducted, a different solvent may be used for each polymerization reaction.

The polymerization temperature is typically within a range from room temperature to 200° C., and is preferably from 40 to 150° C. Furthermore, although the reaction time varies depending on the scale of the reaction, a typical reaction time is within a range from 0.5 to 100 hours. Halting of the polymerization reaction can be achieved by lowering the temperature of the reaction system.

Following completion of the polymerization reaction, the target polymer can be isolated using a conventional separation and purification method such as column purification, reduced pressure purification or filtration or the like. Following isolation, the polymer is preferably re-dissolved and then re-precipitated in order to obtain a higher purity polymer. Furthermore, tracking of the progress of the polymerization reaction, or confirmation of reaction completion, can be conducted using techniques such as gas chromatography, liquid chromatography, gel permeation chromatography, membrane osmometry, and NMR.

As follows is a more detailed description of the present invention based on a series of examples, although the technical scope of the present invention is in no way limited by these examples.

Example 1

A flask was charged with 10.0 g (100 mmol) of MMA (methyl methacrylate, set molecular weight: 20,000), 0.20 g (1 mmol) of Al(Oi—Pr)$_3$, and 23.3 g of toluene (monomer concentration: 25 wt %), and the resulting mixture was degassed. To this mixed solution was added 0.24 g (0.25 mmol) of dichlorotris(triphenylphosphine) ruthenium, and the mixture was stirred to generate a uniform mixture. 0.098 g (0.5 mmol) of ethyl 2-bromoisobutyrate was then added as a reaction initiator, and a polymerization reaction was initiated by heating to 80° C.

7 hours after initiation of the polymerization reaction, 2 g of degassed acetonitrile was added, and the resulting mixture was stirred for 1 hour. After approximately 5 minutes, the color of the reaction solution changed from brown to a muddy yellow color. Following cooling of the reaction solution to 0° C., the precipitate was removed by filtration. The filtrate was concentrated, the solvent was replaced with THF, and a re-precipitation was then conducted by pouring a large quantity of methanol. This operation was repeated three times, and the resulting polymer was then dried under reduced pressure at 60° C. for 5 hours. 5.5 g of white crystals were obtained (isolated yield: 55%). Analysis by GPC revealed a monodisperse polymer for which Mn=15,600, and Mw/Mn=1.19.

Comparative Example 1

The same preparation as the example 1 was conducted, but no acetonitrile was added.

Example 2

The same preparation as the example 1 was conducted, but the polymer was washed samples 3 times with 10 ml of water prior to conducting the re-precipitation treatment.

Comparative Example 2

The same preparation as the example 2 was conducted, but no acetonitrile was added.

Example 3

The same preparation as the example 1 was conducted, but n-Bu$_3$N was used instead of the Al(Oi—Pr)$_3$.

Comparative Example 3

The same preparation as the example 3 was conducted, but no acetonitrile was added.

Example 4

The same preparation as the example 1 was conducted, but Ru(Cp*)Cl(PPh$_3$)$_2$ was used instead of the RuCl$_2$(PPh$_3$)$_3$.

Comparative Example 4

The same preparation as the example 4 was conducted, but no acetonitrile was added.

Example 5

The same preparation as the example 1 was conducted, but 3-hydroxypropionitrile was used instead of the acetonitrile.

Example 6

A flask was charged with 10.0 g (100 mmol) of MMA (methyl methacrylate, set molecular weight: 20,000), 0.20 g (1 mmol) of Al(Oi—Pr)$_3$, 2 g of acetonitrile, and 23.3 g of toluene, and the resulting mixture was degassed. To this mixed solution was added 0.24 g (0.25 mmol) of dichlorotris (triphenylphosphine) ruthenium, and the mixture was stirred to generate a uniform mixture. 0.098 g (0.5 mmol) of ethyl 2-bromoisobutyrate was then added, and a polymerization reaction was initiated by heating to 80° C.

20 hours after initiation of the polymerization reaction, the reaction solution was cooled to 0° C. The precipitate was removed by filtration, and following concentrating of the filtrate and replacement of the solvent with THF, a re-precipitation was conducted by pouring a large quantity of methanol. This operation was repeated three times, and the resulting polymer was then dried under reduced pressure at 60° C. for 5 hours. 3.8 g of white crystals were obtained (isolated yield: 38%). Analysis by GPC revealed a monodisperse polymer for which Mw=103,000, and Mw/Mn=1.52.

[Evaluation and Results]

For each of the polymers produced in the aforementioned examples 1 to 6 and comparative examples 1 to 4, the ruthenium complex content was measured using an inductively coupled plasma emission spectrometer (ICP-AES). Furthermore, for those polymers where Al(Oi—Pr)$_3$ was used as the reaction accelerant, the Al content within the polymer was also measured. The results are shown in Table 1.

TABLE 1

| Example | Complex | Reaction accelerant | Nitrile compound | Separation operation | ICP-AES (ppm) Ru | ICP-AES (ppm) Al | Removal rate (%) Ru | Removal rate (%) Al |
|---|---|---|---|---|---|---|---|---|
| Example 1 | RuCl$_2$(PPh$_3$)$_3$ | Al(Oi-Pr)$_3$ | AN | Did not Conduct | 7 | 140 | 99.7 | 94.8 |
| Comparative example 1 | | | none | | 170 | 1200 | 92.6 | 60.2 |
| Example 2 | RuCl$_2$(PPh$_3$)$_3$ | Al(Oi-Pr)$_3$ | AN | Conducted | 10 | 11 | 99.6 | 99.6 |

TABLE 1-continued

| Example | Complex | Reaction accelerant | Nitrile compound | Separation operation | ICP-AES (ppm) Ru | ICP-AES (ppm) Al | Removal rate (%) Ru | Removal rate (%) Al |
|---|---|---|---|---|---|---|---|---|
| Comparative example 2 | | | none | | 62 | 18 | 97.2 | 99.3 |
| Example 3 | RuCl$_2$(PPh$_3$)$_3$ | n-Bu$_3$N | AN | Did not Conduct | 22 | — | 99.1 | — |
| Comparative example 3 | | | none | | 110 | — | 95.6 | — |
| Example 4 | Ru(Cp*)Cl(PPh$_3$)$_2$ | n-Bu$_3$N | AN | Did not Conduct | 40 | — | 97.8 | — |
| Comparative example 4 | | | none | | 57 | — | 96.6 | — |
| Example 5 | RuCl$_2$(PPh$_3$)$_3$ | Al(Oi-Pr)$_3$ | PN | Conducted | 11 | 5.8 | 99.5 | 99.8 |
| Example 6 | RuCl$_2$(PPh$_3$)$_3$ | Al(Oi-Pr)$_3$ | AN | Did not Conduct | 8 | 12 | 99.7 | 99.5 |

In the examples 1 to 3, where acetonitrile was added to a reaction system that used RuCl$_2$(PPh$_3$)$_3$ as the ruthenium complex, the ratio of residual ruthenium was extremely low in each case, and the removal effect was noticeably superior to the corresponding comparative examples 1 to 3. Furthermore, in those reaction systems where Al(Oi—Pr)$_3$ was used as the reaction accelerant, it was evident that the water washing treatment was able to remove almost all of the Al. Furthermore, when the different reaction accelerants are compared, it was clear that although the ruthenium complex was able to be effectively removed in both cases, those cases in which Al(Oi—Pr)$_3$ (a Lewis acid) was used yielded a higher ruthenium removal rate.

Furthermore in the example 4, where acetonitrile was added to a reaction system that used Ru(Cp*)Cl(PPh$_3$)$_2$ as the ruthenium complex, the ruthenium complex was still removed, although the removal rate was not as high as that observed in the examples 1 to 3 that used RuCl$_2$(PPh$_3$)$_3$ as the ruthenium complex.

In the example 5, where 3-hydroxypropionitrile was used instead of the acetonitrile used in the example 1, the ruthenium complex was still satisfactorily removed.

Furthermore in the example 6, where the acetonitrile was added from the point of polymerization initiation, the ruthenium complex was still satisfactorily removed.

INDUSTRIAL APPLICABILITY

According to the present invention, ruthenium complexes can be removed easily and efficiently from a polymer or a polymerization solution obtained following recovery of a polymer, and furthermore, a purified polymer from which ruthenium complexes have been satisfactorily removed can also be obtained.

The invention claimed is:

1. A method for removing metallic ruthenium from a polymer produced using a ruthenium complex as the polymerization catalyst or a polymer solution obtained following recovery of the polymer, wherein the metallic ruthenium is incorporated within a ruthenium complex having a ruthenium metal core surrounded by ligands, comprising: adding a compound selected from the group consisting of nitrile compounds and (alkyl)phosphorus-based compounds, that is capable of coordinating with ruthenium via a substitution of a ligand of said ruthenium complex, thereby precipitating another ruthenium complex in which a ligand has been substituted, wherein the quantity added of the compound that is capable of coordinating with ruthenium via a substitution of a ligand of said ruthenium complex is within a range from 1 to 100 molar equivalents relative to the ruthenium complex.

2. A method for removing metallic ruthenium according to claim 1, wherein said polymer is polymerized by a living radical polymerization system in which an organohalogen compound having at least one halogen atom within each molecule is used as an initiator, and the polymerization reaction is conducted using a ruthenium complex as a catalyst.

3. A method for removing metallic ruthenium according to claim 2, wherein a tertiary amine is used as a reaction accelerant for said living radical polymerization.

4. A method for removing metallic ruthenium according to claim 1, wherein said compound that is capable of coordination via a substitution of a ligand of said ruthenium complex is a nitrile compound.

5. A method for removing metallic ruthenium according to claim 1, wherein said ruthenium complex is dichlorotris (triphenylphosphine) ruthenium.

6. A method for producing a polymer, wherein a method for removing metallic ruthenium according to claim 1 is used for removing metal and purifying said polymer.

7. A method for producing a polymer, wherein a method for removing metallic ruthenium according to claim 2 is used for removing metal and purifying said polymer.

8. A method for producing a polymer, wherein a method for removing metallic ruthenium according to claim 3 is used for removing metal and purifying said polymer.

9. A method for producing a polymer, wherein a method for removing metallic ruthenium according to claim 4 is used for removing metal and purifying said polymer.

10. A method for producing a polymer, wherein a method for removing metallic ruthenium according to claim 5 is used for removing metal and purifying said polymer.

* * * * *